Sept. 22, 1970 G. F. POPE 3,530,432
CONTROL APPARATUS FOR OUTDOOR LIGHTING CIRCUIT
Filed May 31, 1967

INVENTOR:
GEORGE F. POPE
BY Parrott, Bell, Seltzer, Park & Heard
ATTORNEYS

United States Patent Office 3,530,432
Patented Sept. 22, 1970

3,530,432
CONTROL APPARATUS FOR OUTDOOR LIGHTING CIRCUIT
George F. Pope, Burlington, N.C., assignor to Diversified Manufacturing & Marketing Co., Inc., Burlington, N.C., a corporation of North Carolina
Filed May 31, 1967, Ser. No. 642,581
Int. Cl. G08g 1/02
U.S. Cl. 340—31    10 Claims

ABSTRACT OF THE DISCLOSURE

An outdoor lighting circuit control apparatus in which a trip device, responsive to passage of a vehicle thereover, momentarily energizes a solenoid whose plunger then moves through an operation stroke effective to start operation of a timing device through a time cycle of adjustably variable duration and wherein the timing device activates the lighting circuit for the duration of the time cycle.

---

This invention relates to outdoor lighting systems, and more particularly to an improved control apparatus for activating an outdoor lighting circuit.

As is well known, residential outdoor lighting systems are desirable as a deterrent to prowlers and vandals, as well as for providing illumination while in transit between the garage and the house during hours of darkness. Such lighting systems are usually activated by manual switches located within the house or the garage of the residence.

It can be appreciated that automatic vehicular-activated outdoor lighting systems are preferred, in order that the lighting circuit may be activated without necessity of the occupant of the vehicle leaving the same to operate a manual switch.

Various types of vehicular-activated lighting systems have been constructed heretofore, but have not been entirely satisfactory. Most of them are not controllable as to the duration of activation of the lighting circuit, and require manual shut-off of the lighting circuit after it has been activated by the vehicle. Such of them as are controllable as to duration of light activation include involved and expensive circuitry and a large number of parts, thereby being expensive to build and difficult to maintain in proper working order.

It is therefore an object of the present invention to provide an improved and simplified vehicular-activated outdoor lighting system which avoids the drawbacks and disadvantages of previous constructions.

It is a more specific object of the invention to provide a lighting system adapted for both manual activation and vehicle activation, and in which the lighting circuit remains activated for a predetermined time interval, whereupon the circuit is automatically deactivated.

In a preferred form of the invention, a trip means is provided, adapted to be actuated upon passage of a vehicle thereover. Actuation of the trip means momentarily activates a solenoid, moving the solenoid plunger through an operation stroke, and the stroke of the plunger starts operation of a timing device through a time cycle of adjustably variable duration. The timing device in turn activates a light switch, activating the lighting circuit, and maintains the light switch activated until the expiration of the time cycle, whereupon the timing device automatically deactivates the switch, and thereby deactivates the lighting circuit.

Some of the objects of the invention having been stated, other objects will appear as the description proceeds, when taken in connection with the accompanying drawings, in which—

Figure 1:
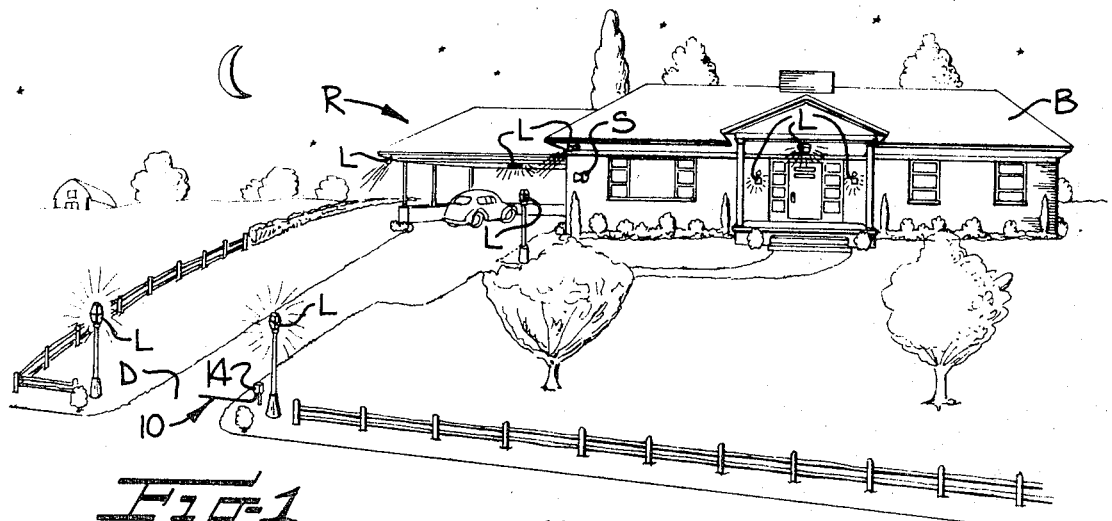
Figure 2:
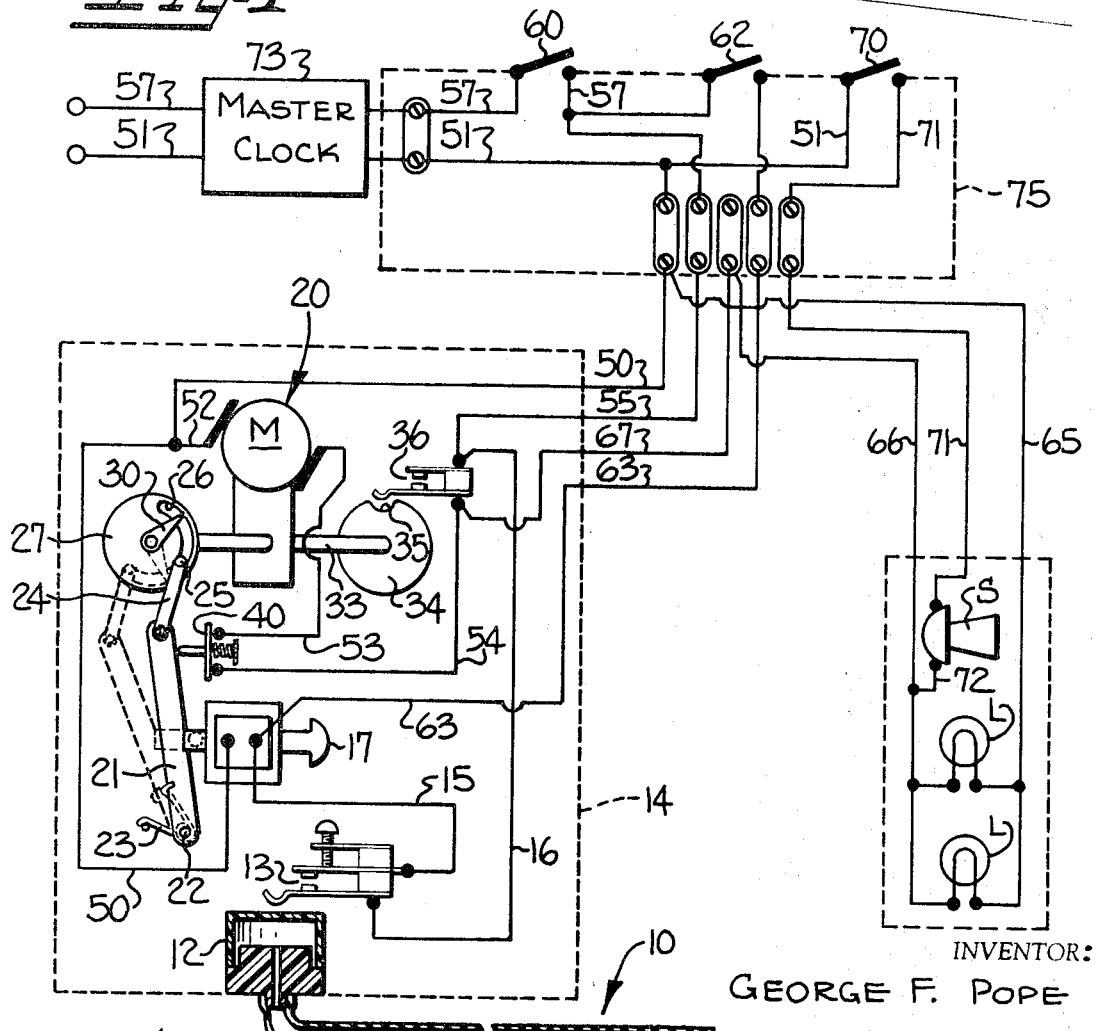

FIG. 1 is a perspective view of a residence provided with an outdoor lighting system according to the present invention; and FIG. 2 is a schematic diagram showing wiring for the lighting system and a control apparatus for activating the lighting circuit thereof.

Referring more specifically to the drawings, FIG. 1 illustrates a typical residence having a driveway D leading from a roadway or street to a building B with suitable electric lights L conveniently positioned about the premises of the residence. A warning device S, such as an electric siren, may be positioned on one of the exterior walls of the building.

Lights L are parts of an electrical lighting system shown schematically in FIG. 2 and including means for automatically activating the lighting circuit for the lights L (and the siren S, if desired) for an interval of predetermined duration upon actuation of a trip means 10 adapted to be actuated upon passage of a vehicle thereover moving along driveway D. Of course, the trip means may be actuated by any significant pressure being applied thereto, as by a person stepping thereon. In fact, although only a single trip means 10 is shown, it is contemplated that other similar trip means may be strategically positioned about the grounds such as to be actuated by prowlers, vandals, etc., if desired.

Preferably, and as illustrated (FIG. 2), trip means 10 comprises a hollow pneumatic tube 11 resting on driveway D, one end of which is closed and the other end of which is communicatively connected with the interior of a suitable pneumatic bellows 12 to close a normally open trip switch 13 when tube 11 is compressed, as by a vehicle passing thereover.

Bellows 12 comprises a pair of relatively movable bellows elements loosely fitted together to restrict air flow out of the interior of bellows 12, but in a non-airtight relationship. When tube 11 is compressed, a puff of air is forced therefrom into the interior of bellows 12, and the relatively movable bellows elements accordingly move apart, closing trip switch 13. However, due to the loose fitting relationship of the movable bellows elements, the puff of air within bellows 12 quickly leaks out therebetween and the bellows elements then move together again, permitting trip swtich 13 to reopen. Accordingly, passage of a vehicle over tube 11 causes only a momentary closing of trip switch 13.

Trip switch 13 may be positioned in a suitable housing 14, and has conductors 15, 16 connected to opposite sides thereof. Conductor 15 leads from trip switch 13 to one end of the coil of an electromagnetic means such as a solenoid 17 operatively associated with a timing device broadly designated at 20 and also positioned within housing 14. As shown, one end of the plunger of solenoid 17 engages suitable linkage including a lever 21 pivoted at its lower end, as at 22, to a wall of the housing 14. Lever 21 is normally biased to the retracted or solid line position of FIG. 2 by a suitable spring means 23, shown in the form of a torsion spring.

The upper end of lever 21 has a link 24 pivotally connected thereto and extending upwardly therefrom. The upper end of link 24 is provided with a connector means in the form of a follower 25 which rides in an arcuate double-ended slot 26 formed in a normally stationary rotary timer component or disc 27. An adjustable control member 30, which overlies or may be positioned within arcuate slot 26, is adjustably secured to disc 27. The outer face of disc 27 may be suitably calibrated, if desired, to facilitate the proper positioning of control member 30 during adjustment thereof.

Disc 27 is fixed on a shaft 33, on which a suitable switch actuator means or cam 34 is mounted. Cam 34 normally occupies an inactive position, and is movable in fixed relation with disc 27. In fact, the peripheral surface of timer component or disc 27 may be configured to serve the same purpose as that to be presently described with respect to cam 34.

As shown, cam 34 is provided with a recess 35 normally positioned in registration with the armature of a normally open light switch 36. It is to be understood that switch 36 may be of the normally closed type, in which instance the recess 35 would be in the form of a protuberance on the periphery of the disc-shaped cam 34.

Shaft 33 is driven by and is a part of a timer means or clock motor 37 which may be in the form of a synchronous electric motor, as shown, or which may be a spring driven type of clock motor. If a spring driven clock motor is desired instead of electric clock motor 37, an electrically oprable clutch means (not shown) may be interposed between such clock motor and shaft 33. In such instance, the wiring hereinafter described for electric clock motor 37 would be instead directed to such electric clutch means.

When the plunger of solenoid 17 occupies the normal retracted position, it can be said that it occupies a first position in which the follower 25 is in engagement with the trailing or lower end of the arcuate slot 26 in disc 27. Upon energization of the coil of solenoid 17, either by the closing of trip switch 13 or by means of a manual switch to be later described, the plunger of solenoid 17 is caused to move through a stroke of predetermined length to a fully extended or second position, during the course of which the follower 25 moves in engagement with the trailing end of the arcuate slot 26 in disc 27. This rotates disc 27 in a reverse or rearward direction so that lever 21 and link 24 occupy substantially the dotted line position of FIG. 2. A normally open switch 40, which is normally held in closed position by the lever 21, is then permitted to open, and delays operation of timer motor 37 until switch 40 is again closed.

It will be noted that, immediately upon initiation of the aforementioned rearward movement of disc 27, the recess 35 of cam 34 moves out of registration with the armature of switch 36, and the periphery of cam 34 then engages the switch armature, closing light switch 36. This activates the lighting circuit, to be more fully described hereinafter.

Assuming that energization of the coil of solenoid 17 is effected by trip switch 13, movement of the plunger of solenoid 17 to its fully extended position will be immediately followed by full retraction thereof by spring 23, since trip switch 13 is but momentarily closed by bellows 12, as described heretofore. Of course, spring 23 also returns lever 21 and link 24 to the retracted or solid-line position and, in so doing, the follower 25 moves along the slot 26 relative to disc 27 until it engages control member 30, whereupon it imparts forward rotary motion to disc 27, shaft 33 and cam 34 until the follower 25 has reached the fully retracted position shown in solid lines in FIG. 2. Thus, the duration of the interval in which the lighting circuit is active depends upon the remaining angular distance the disc 27 must then be rotated by the motor 37 before the trailing end of the slot 26 returns into engagement with the follower 25. Of course, at the instant that the trailing end of the slot 26 returns into engagement with the follower 25, the recess 35 also moves into registration with the armature of light switch 36, permitting the same to reopen and to cut off the lighting circuit as well as clock motor 37.

Referring now to the electrical connections between the various components of the lighting system, opposite ends of conductor 15 are connected to the strip switch 13 and to the coil of solenoid 17, as heretofore stated. The other end of the coil of solenoid 17 has a conductor 50 leading therefrom to a lead conductor 51 extending from one side of a suitable source of electrical energy, not shown. A branch conductor 52 extends from conductor 50 to one side of clock motor 37, the other side of which has a conductor 53 leading therefrom to one side of the switch 40. The other side of switch 40 is connected to one side of light switch 36 by a conductor 54, and the other side of switch 36 has the conductor 16 connected thereto. A conductor 55 also is connected to the other side of switch 36, and leads to a second lead conductor 57 extending from the other side of the source of electrical energy. A manually operable master switch 60 may be interposed in conductor 57.

A manually operable bypass switch 62 is arranged in shunting parallel relationship with trip switch 13, so that solenoid 17 may be energized either by actuation of trip switch 13 upon compression of the tube 11, or by closing bypass switch 62. As shown, one side of bypass switch 62 is connected to the coil of solenoid 17 by means of a conductor 63, and the other side of switch 62 is connected to the lead conductor 57 in series with master switch 60.

It is apparent that anytime bypass switch 62 is closed, it will complete an energizing circuit to the coil of solenoid 17, and will cause the solenoid plunger to move into and remain in the fully extended or dotted line position of FIG. 2 so long as bypass switch 62 remains closed. Upon subsequent manual opening of bypass switch 62, the timing device 20 will then operate through its timing cycle in the manner heretofore described.

It is apparent that the switch 40 is provided to open the electric circuit to the electric clock motor 37 throughout any period that manual bypass switch 62 occupies the closed position. Without switch 40, such a circuit would be completed, since the cam recess 35 is out of registration with the armature of the light switch 36 during the entire period in which the bypass switch 62 is closed, provided, of course, that master switch 60 then occupies the closed position.

For the purposes of description only, it may be assumed that conductors 65, 66, to which opposite sides of the electric lights L are connected in parallel, constitute the lighting circuit, and these two conductors 65, 66 are connected to the conductor 50 and the conductor 67, respectively. Thus, in effect conductor 65 is connected to lead conductor 51. The conductor 67 extends to that side of the normally open light switch 36 to which conductor 54 is connected.

It is apparent that it is not always desirable that the warning device or siren S be operated every time the lighting circuit is activated. Accordingly, it will be observed in the right-hand portion of FIG. 2 that siren S is provided with means for selectively electrically connecting the same into the light circuit. To this end, it will be observed that lead conductor 51 is connected through a manually operable selector switch 70 to one end of a conductor 71. Conductor 71 leads to one side of siren S. The other side of the siren S is connected to conductor 66 by means of a conductor 72.

The lighting system is of significant utility only during hours of darkness, as is apparent, and it is therefore desirable that it be shut off at other times, lest actuation of trip means 10 incidental to daytime movement of vehicles over driveway D, or by mischievous children, prove a nuisance by frequently activating the lights L. While such shut-off may be easily achieved by manual opening of master switch 60, it may be desirable to provide means for automatically turning on the lighting system during desired hours of operation thereof, e.g., hours of darkness, and for automatically shutting it off during other hours, e.g., hours of daylight.

To this end, shut-off means such as a master clock 73 may be interposed in lead conductors 51, 57 between the lighting system and the source of electrical energy therefor. Master clock 73 may be of a type including internal switch means (not shown) operated by clock 73 to close during preselected hours and to open during other hours. Since such master clocks are well known, no further description thereof is deemed necessary.

As an additional alternative, master clock 73 could be replaced in lead conductors 51, 57 by a conventional photosensitive device of the type frequently used on city street lights and effective to shut off the lighting system in response to sunlight and to turn it on during hours of darkness.

In the installation of the lighting system, it has been found desirable to position the manual switches 60, 62, 70 in a control box or control panel 75 with the building B. Thus, the sets of conductors 50, 55, 63, 67 and 65, 66, 71 may extend through or may form respective multi-wire underground cables extending from control panel 75 to housing 14 and lights L.

In operation, timing means 20 is first set to produce a time cycle of a desired duration. This is done by appropriately adjusting control member 30 on disc 27 relative to slot 26 and follower 25, in the manner heretofore set forth. Thereafter, when the lighting system is turned on, i.e., the switches in master clock 73 are closed, and master switch 60 is manually closed, lights L may be activated either by actuating trip means 10 or by manually closing bypass switch 62. Either of these actions will energize the coil of solenoid 17, moving the recess 35 of cam 34 out of registration with the armature of light switch 36. Such motion closes switch 36, thereby activating the lighting circuit for lights L.

If the activation of lights L is effected by actuation of trip means 10, energization of solenoid 17 will be of only momentary duration and the solenoid plunger will immediately complete its stroke, i.e., return to its retracted position, thereby starting clock motor 37 to drive cam 34 towards re-registration of its recess 35 with the armature switch 36. When motor 37 has driven shaft 33 forwardly a sufficient angular distance, as determined by the adjusted position of control member 30 on disc 27, cam recess 35 will re-register with the armature of switch 36 and permit siwtch 36 to open, deactivating the lighting circuit to lights L.

If, however, activation of lights L is effected by manual closing of switch 62, the solenoid plunger will remain in its extended position for so long as switch 62 remains closed, and this will delay initiation of the operation of motor 37. Thus, switch 36 will remain closed by cam 34 for so long as bypass switch 62 remains closed. This will be useful for maintaining lights L on for long periods of time, such as for a lawn party or the like. When it is subsequently desired to deactivate lights L, switch 62 is manually opened, permitting solenoid 17 to return to its retracted position and initiate the timing cycle aforesaid. Thus, at the expiration of the predetermined time interval after manual reopening of switch 62, lights L will be deactivated by re-registration of cam recess 35 with the armature of switch 36.

When the lighting system is to be used for alerting occupants of the building B to the presence of prowlers or vandals, it may be desirable to include siren S in the lighting circuit, as well as lights L. When this is desired, switch 70 is simply closed, connecting siren S in parallel with lights L, as aforesaid. Thereafter, when the lighting circuit is activated by any means, i.e., either by the manual switch 62 or by the trip means 10, the siren S will be sounded as well as lights L being activated, until the lighting circuit is deactivated.

In the drawings and specification there has been set forth a preferred embodiment of the invention and, although specific terms are employed, they are used in a generic and descriptive sense only and not for purposes of limitation, the scope of the invention being defined in the claims.

I claim:

1. In an outdoor lighting system including a normally inactive electrical lighting circuit, the combination therewith of apparatus for activating the lighting circut comprising trip means adapted to be actuated upon passage of a vehicle thereover, a solenoid having a plunger operable through a stroke of predetermined length in response to actuation of said trip means, normally inactive light switch means in said lighting circuit for activating said circuit when the switch means is active, normally inactive timing means including a timer component and switch actuator means both movable in response to the stroke of said plunger for activating said light switch means and activating said timing means, said timing means, when active, being operable to drive said timer component and switch actuator means, said switch actuator means being operable to maintain said light switch means active throughout the duration of operation of said timing means and to then deactivate said light switch means, and control means on said timer component adjustably positionable relative to said plunger for selectively varying the duration of operation of said timing means independently of the length of stroke of said plunger to thus vary the duration of time that said light switch means and thus the lighting circuit are activated.

2. A structure according to claim 1, in which said switch actuator means comprises a cam normally occupying an inactive position and movable in fixed relation with said timer component, said timing means including means for driving said timer component and said cam in a forward direction during operation of said timing means, said plunger being movable from a first position to a second position and back to said first position during each stroke thereof, connector means carried by said plunger and arranged to impart motion in a rearward direction to said timer component throughout movement of said plunger to said second position to move said cam out of said inactive position, said connector means being movable relative to said timer component during a portion of the movement of said plunger back to said first position, said connector means also being engageable with said control means in the course of movement of said plunger back to said first position to move said timer component and said cam in said forward direction a lesser distance than they were moved in said rearward direction, and said cam being formed to maintain activation of said light switch means whenever said cam is out of inactive position.

3. A structure according to claim 2, in which said timer component comprises a rotary element normally occupying a predetermined inactive position and having an arcuate double-ended slot therein generated about the axis of said rotary element, said connector means including a follower means fitting loosely in said slot, said follower means being arranged to engage one end of said slot and thereby rotate and impart motion in said rearward direction to said timer component throughout movement of said plunger to said second position, and said control means being adjustable on said rotary element to vary the effective length of said slot so that said follower means engages said control means during movement of said plunger back to said first position and moves said rotary element and said cam in said forward direction and toward said inactive position said lesser distance than they were moved in said rearward direction.

4. A structure according to claim 2, including means operatively related to said timing means and responsive to the movement of said plunger from said first to said second position for delaying activation of said timing means until said plunger returns to said first position.

5. A structure according to claim 1, wherein said timing means also comprises a normally deenergized electric motor drivingly connected to said timer component and to said switch actuator means, and said light switch means also being operable when activated to energize said motor and thereby activate said timing means.

6. A structure according to claim 1, wherein said trip means comprises a pneumatic tube compressible by passage of the vehicle thereover, and a trip switch electrically connected to said solenoid and operatively related to said pneumatic tube for momentarily completing an electrical circuit to said solenoid and thereby operating said plunger through said stroke thereof upon compression of said tube.

7. A structure according to claim 6, further comprising normally inactive bypass switch means electrically connected to said solenoid in parallel shunting relation to said trip switch, and being manually operable for completing an electrical circuit to said solenoid to operate said plunger independently of said trip switch.

8. A structure according to claim 1, including an electrical warning device, and means for selectively electrically connecting said warning device into said lighting circuit.

9. A circuit control apparatus comprising a normally inactive timing means having a normally inactive timer component and switch actuator means normally operable through a predetermined time cycle when said timing means is activated, a normally inactive electromagnetic means adapted to be activated and deactivated successively and having a plunger component movable through active and inactive strokes of a predetermined length upon respective activation and deactivation of said electromagnetic means, connection means operatively connecting said plunger component to said timer component to move said timer component and said switch actuator means a predetermined amount in one direction from a first position to a second position upon each active stroke of said plunger component, a switch means which is inactive when said switch actuator means occupies said first position and which is rendered active in response to said switch actuator means being positioned out of said first position, said connection means being operable to activate said timing means upon initiation of each inactive stroke of said plunger component, and control means carried by said timer component and responsive to each inactive stroke of said plunger component to return said timer component and said actuator means toward said first position a predetermined amount less than said first-named predetermined amount whereby the duration of the time cycle of said timing means incident to returning said switch actuator means to said first position is correspondingly reduced to control the duration of time during which said switch means is active.

10. Apparatus for activating a normally inactive electrical lighting circuit, said apparatus comprising a normally inactive timing means having a normally inactive timer component and switch actuator means normally operable through a predetermined time cycle when said timing means is activated, a normally inactive electromagnetic means having a plunger component movable through active and inactive strokes of a predetermined length, trip switch means adapted for successively activating and deactivating said electromagnetic means to effect successive active and inactive strokes to said plunger component, connection means operatively connecting said plunger component to said timer component to move said timer component and said switch actuator means a predetermined amount in one direction from a first position to a second position upon each active stroke of said plunger component, light switch means in said circuit and being inactive when said switch actuator means occupies said first position and which is rendered active to activate said lighting circuit in response to said switch actuator means being positioned out of said first position, said connection means being operable to activate said timing means upon initiation of each inactive stroke of said plunger component, and adjustable control means carried by said timer component and responsive to each inactive stroke of said plunger component to return said timer component and said switch actuator means toward said first position a predetermined amount less than said first-named predetermined amount whereby the duration of the time cycle of said timing means incident to returning said actuator means to said first position is correspondingly reduced to control the duration of time that said light switch means and the lighting circuit are active.

References Cited

UNITED STATES PATENTS

| 1,973,275 | 9/1934 | Babson | 340—31 X |
| 2,118,930 | 5/1938 | Lilja | 340—32 |
| 2,655,606 | 10/1953 | Trimble | 343—225 X |

THOMAS B. HABECKER, Primary Examiner

C. M. MARMELSTEIN, Assistant Examiner

U.S. Cl. X.R.
340—51, 258, 309.1